United States Patent [19]

Childress et al.

[11] Patent Number: 5,071,193
[45] Date of Patent: Dec. 10, 1991

[54] CABLE MOUNT FOR SEAT BELT BUCKLE

[75] Inventors: Keith D. Childress, Richmond; Thomas J. Corbett, Sterling Heights; Ronald Dickson, Troy; Michele A. Smith, Davisburg, all of Mich.

[73] Assignee: Saturn Corporation, Troy, Mich.

[21] Appl. No.: 255,236

[22] Filed: Oct. 11, 1988

[51] Int. Cl.$^5$ ............................................. A62B 35/00
[52] U.S. Cl. ............................... 297/468; 24/265 AL
[58] Field of Search ............... 297/468, 470, 471, 482; 24/265 A, 115 A, 115 K, 265 AL; 280/801, 802, 805; 403/210

[56] References Cited

U.S. PATENT DOCUMENTS

| | | | |
|---|---|---|---|
| 2,809,142 | 10/1957 | Beeber et al. | 24/265 A X |
| 3,437,349 | 4/1969 | Feles et al. | 297/482 |
| 3,692,361 | 9/1972 | Ivarsson | 297/385 |
| 3,867,046 | 2/1975 | Fox | 403/210 |
| 4,181,359 | 1/1980 | Nard | 297/468 |
| 4,199,190 | 4/1980 | Lindblad | 297/468 |

*Primary Examiner*—Jose V. Chen
*Attorney, Agent, or Firm*—Charles E. Leahy

[57] ABSTRACT

The ends of a cable are attached to the seat belt buckle so that a loop of cable projects from the buckle. A mounting bracket comprised of a stamped metal strap is folded into a U-shape and receives the loop of cable. The ends of the metal strap are attached to the vehicle body. A sleeve of ductile metal is swaged over the cable and interposed between the cable and the bracket. The sleeve has a length greater than the width of the bracket so that the sleeve extends beyond the bracket somewhat to prevent the cable from contact with the bracket. The ductile sleeve yields when a load is imposed upon the cable.

3 Claims, 1 Drawing Sheet

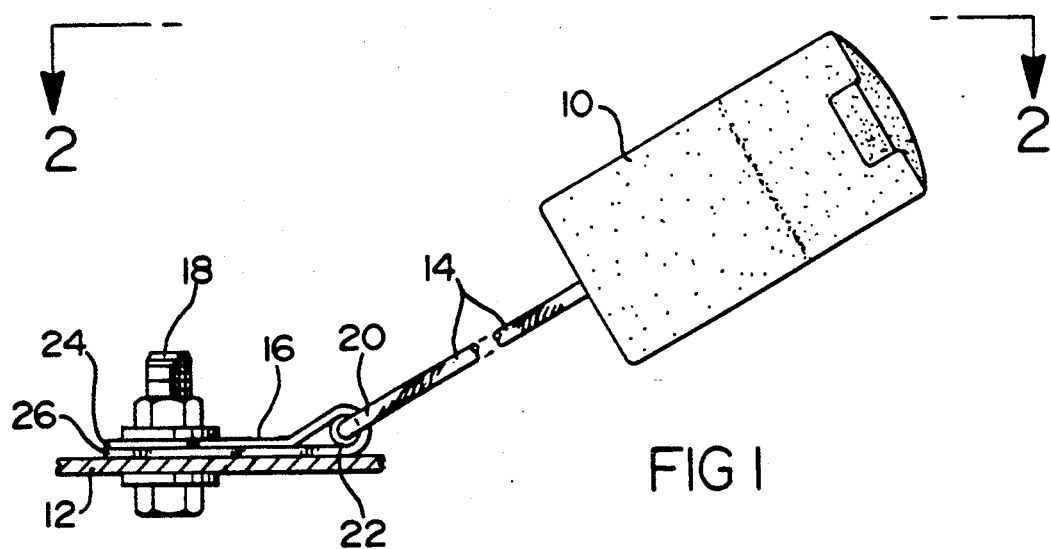
FIG 1
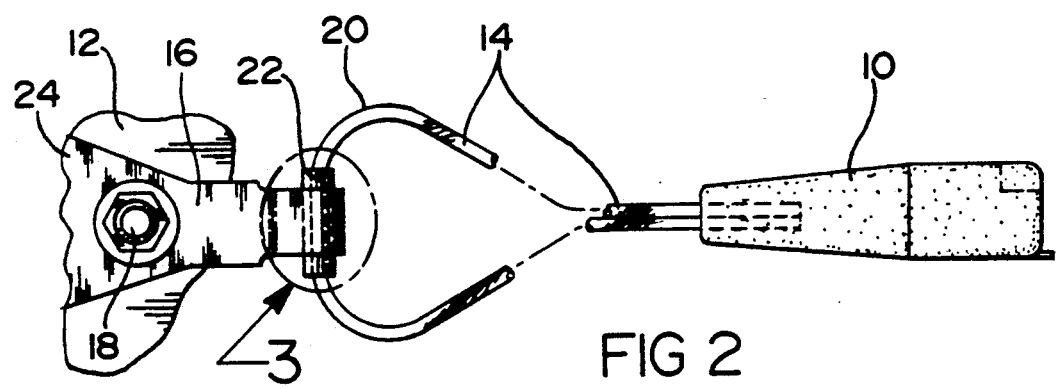
FIG 2
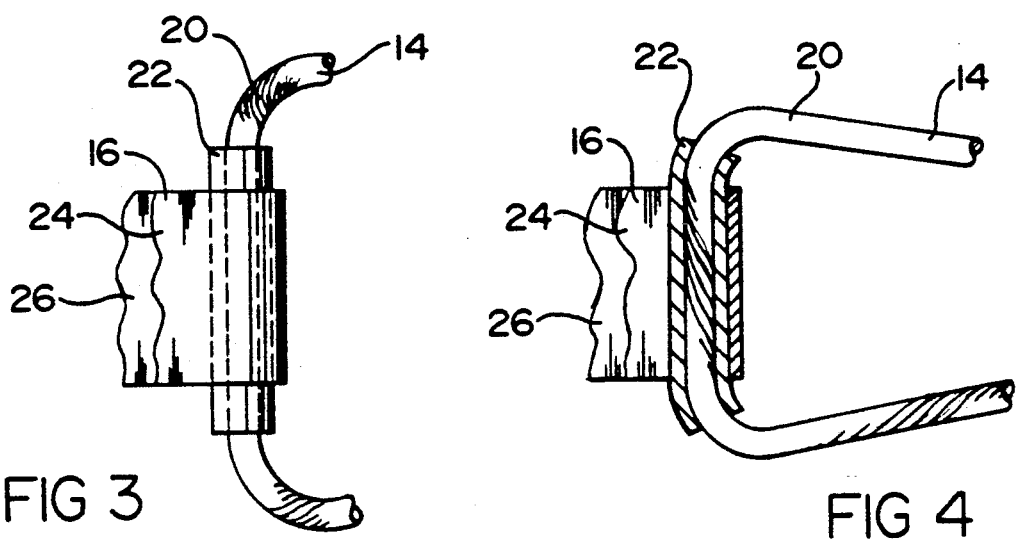
FIG 3
FIG 4

CABLE MOUNT FOR SEAT BELT BUCKLE

The invention relates to the use of a cable to mount a seat belt buckle on a vehicle body and more particularly provides a ductile sleeve swaged to the cable to isolate the cable from contact with a mounting bracket during imposition of a load on the cable by the seat belt buckle.

BACKGROUND OF THE INVENTION

It is well known in vehicle seat belt systems to attach a seat belt component, such as a seat belt buckle, to the vehicle body via a flexible mounting device such as a loop of cable or a length of belt webbing. One end of the flexible mounting device is attached to the buckle, the other end is attached to a mounting bracket which is in turn bolted to the vehicle body.

The present invention relates to the use of a continuous loop of cable to attach the buckle to the mounting bracket.

SUMMARY OF THE INVENTION

According to the invention the ends of a cable are attached to the seat belt buckle so that a loop of cable projects from the buckle. A mounting bracket comprised of a stamped metal strap is folded into a U-shape and receives the loop of cable. The ends of the metal strap are attached to the vehicle body. A sleeve of ductile metal is swaged over the cable and interposed between the cable and the bracket. The sleeve has a length greater than the width of the bracket so that the sleeve extends beyond the bracket somewhat to prevent the cable from contact with the bracket. The ductile sleeve yields when a load is imposed upon the cable.

BRIEF DESCRIPTION OF THE DRAWINGS

FIG. 1 is a elevation view of the seat belt mounting buckle device according to this invention;

FIG. 2 is a plan view taken in the direction of arrows 2—2 of FIG. 1;

FIG. 3 is an enlarged fragmentary view of the FIG. 2 plan view; and

FIG. 4 is a view similar to FIG. 3 but having parts broken away in section and showing the yielding of the ductile metal sleeve upon imposition of a load on the seat belt.

DESCRIPTION OF THE PREFERRED EMBODIMENT

Referring to FIG. 1, a seat belt component, such as a buckle 10, is mounted on a vehicle body panel 12 by a cable 14, a mounting bracket 16, and a nut and bolt assembly 18. As best seen in FIG. 2, the ends of the cable 14 are suitably anchored inside the buckle 10 so that the cable 14 is disposed in a continuous loop 20. A sleeve 22 of ductile material such as aluminum encircles the cable loop 14 and is preferably swaged thereto so that the sleeve 22 remains at a certain location on the cable 14.

The mounting bracket 16 is a stamped metal strap and is folded into a U-shape which preferably has an interference fit with the sleeve 22. The first end 24 and second end 26 of the mounting bracket 16 are attached to the vehicle body panel 12 by the nut and bolt assembly 18. The bracket 16 preferably has an interference fit with the sleeve 22 so that the buckle 10 is flexibly suspended above the body panel 12 by the cable loop 20.

As seen in FIGS. 2, 3 and 4, the length of the sleeve 22 exceeds the width of the bracket 16 so that the sleeve 22 prevents direct contact between the cable loop 20 and the bracket 16.

As best seen in FIG. 4, the imposition of an occupant restraint load on the buckle 10 causes the cable loop 20 to bend the ends of the sleeve 22 which extend beyond the width of the bracket 16. This bending of the sleeve 22 supports the continuous loop of cable 20 in a smooth radius and prevent the cable 14 from direct contact with the edges of the bracket 16.

It will be understood that the effectiveness of this cable mounting device may be varied by varying the ductility and the wall thickness of the sleeve 22, and the length by which the sleeve 22 exceeds the width of the bracket 16.

Thus it is seen that the invention provides a new and improved device for anchoring a seat belt component on a vehicle body.

The embodiments of the invention in which an exclusive property or privilege is claimed are defined as follows:

1. A device for mounting a seat belt component on a vehicle body comprising:
   a loop of cable attached to the seat belt component;
   a bracket attached to the vehicle body and having a stamped metal strap wrapped around the cable so that the bracket anchors the loop of cable;
   and a sleeve swaged over the cable and interposed between the cable and the bracket, said sleeve having a length greater than the width of the bracket so that the sleeve extends beyond the bracket somewhat to prevent the cable from contact with the bracket, and said sleeve being a ductible material which yields when a load is imposed upon cable by the seat belt component to support the cable in a smooth radius and prevent contact of the cable with the bracket.

2. A device for mounting a seat belt component on a vehicle body comprising:
   a loop of cable attached to the seat belt component;
   a bracket comprised of a stamped metal strap folded into a U-shape receiving the loop of cable and having first and second ends attached to the vehicle body so that the bracket anchors the loop of cable;
   and a sleeve of ductible metal swaged over the cable and interposed between the cable and the bracket, said sleeve having a length greater than the width of the bracket so that the sleeve extends beyond the bracket somewhat to prevent the cable from contact with the bracket, and said sleeve yielding when a load is imposed upon cable by the seat belt component to support the cable in a smooth radius and prevent contact of the cable with the bracket.

3. The device of claim 2 further characterized by the U-shaped bracket having an interference fit relationship with the sleeve.

* * * * *